United States Patent
Martinez et al.

(10) Patent No.: US 9,985,803 B2
(45) Date of Patent: May 29, 2018

(54) METHODS AND APPARATUS FOR PROCESSING DIGITAL COMPOSITE SIGNALS

(71) Applicant: NXP USA, Inc., Austin, TX (US)

(72) Inventors: Vincent Martinez, Roques (FR); Frederic Fernez, Fontenilles (FR)

(73) Assignee: NXP USA, INC., Austin, TX (US)

( * ) Notice: Subject to any disclaimer, the term of this patent is extended or adjusted under 35 U.S.C. 154(b) by 0 days. days.

(21) Appl. No.: 15/592,511

(22) Filed: May 11, 2017

(65) Prior Publication Data

US 2017/0331646 A1 Nov. 16, 2017

(30) Foreign Application Priority Data

May 13, 2016 (EP) .................................... 16290083

(51) Int. Cl.
| | |
|---|---|
| *H04L 25/03* | (2006.01) |
| *H04B 7/14* | (2006.01) |
| *H04L 25/08* | (2006.01) |

(52) U.S. Cl.
CPC ............... *H04L 25/03* (2013.01); *H04B 7/14* (2013.01); *H04L 25/08* (2013.01)

(58) Field of Classification Search
USPC ................................. 375/232, 219; 455/192.1
See application file for complete search history.

(56) References Cited

U.S. PATENT DOCUMENTS

| | | | | |
|---|---|---|---|---|
| 6,563,862 B1 * | 5/2003 | Knutson | ................. | H04L 25/05 341/61 |
| 8,224,276 B2 * | 7/2012 | Aue | ...................... | H04B 1/1036 455/150.1 |
| 9,515,771 B2 * | 12/2016 | Venkob | .................. | H04L 5/001 |
| 9,585,122 B2 * | 2/2017 | Morioka | ............... | H04L 1/1861 |
| 2013/0163512 A1 | 6/2013 | Rexberg et al. | | |

* cited by examiner

*Primary Examiner* — Eva Puente

(57) ABSTRACT

Embodiments include methods and devices for processing a digital composite signal generated at a first sampling rate. The signal includes at least first and second carrier-bands arranged to define a first inner gap between the carrier-bands. The first inner gap includes at least a first gap between the highest frequency of the first carrier-band and the lowest frequency of the second carrier-band. The digital composite signal has a predetermined instantaneous bandwidth that is lower than a sampling bandwidth. An outer gap located outside the instantaneous bandwidth and within the sampling bandwidth is determined. The first inner gap is reduced to define a second inner gap, where a width of the second inner gap is related to a width of the outer gap. The resulting folded digital composite signal is decimated to a second sampling rate lower than the first sampling rate thereby creating a decimated folded digital composite signal.

24 Claims, 7 Drawing Sheets

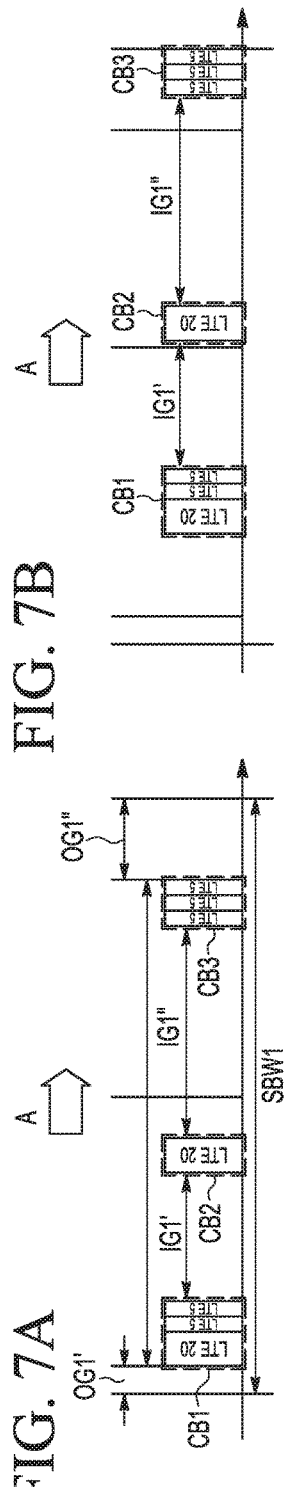
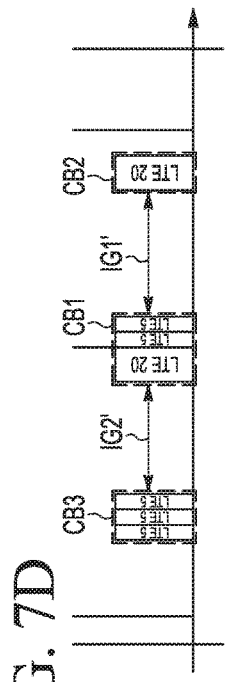
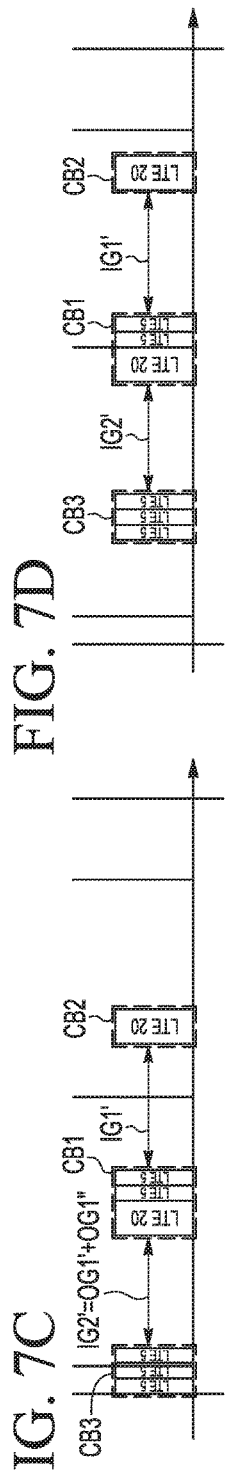
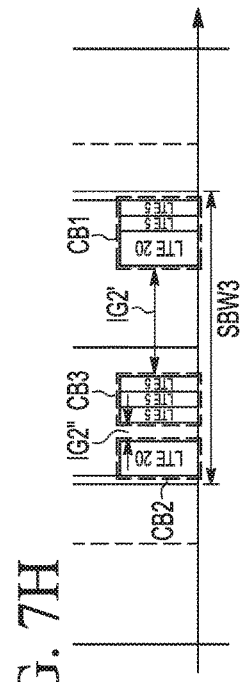
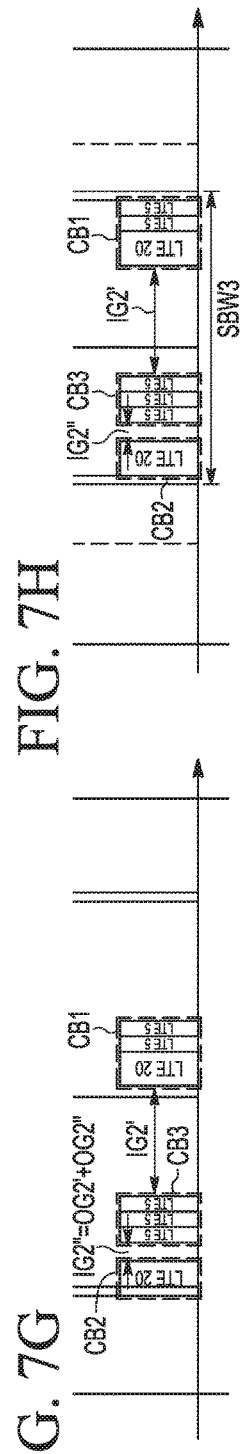
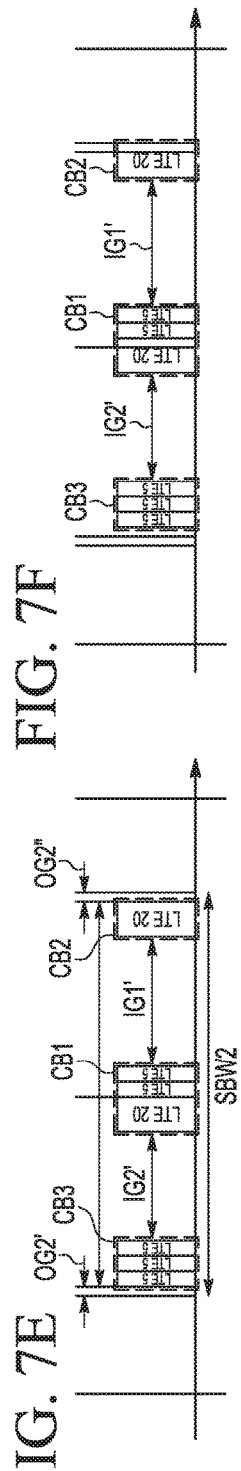

METHODS AND APPARATUS FOR PROCESSING DIGITAL COMPOSITE SIGNALS

CROSS-REFERENCE TO RELATED APPLICATION

This application claims the priority under 35 U.S.C. § 119 of European Patent application no. 16290083.1, filed on May 13, 2016, the contents of which are incorporated by reference herein.

TECHNICAL FIELD

This invention relates to digital signal processing techniques and, more particularly, to techniques for compressing and expanding a digital signal comprising widely separated carrier bands.

BACKGROUND

In a transceiver of a communication system, a digital front end (DFE) is known as the circuitry which lies between the baseband processor and the analog baseband/RF circuits. Generally, the DFE comprises components that process a baseband signal for various channels in the digital domain and provide an up-converted digital signal which may undergo additional signal processing. For instance, the up-converted digital signal may utilize techniques such as noise cleaning, crest factor reduction (CFR) and digital pre-distortion of the signal. Finally, the processed signal may be applied to a digital-to-analog converter of the transceiver before entering a power amplifier.

In multi-band communication systems, the up-converted digital signal may comprise carrier-bands separated by a significant frequency bandwidth. Such configuration represents a challenge for signal processing operations such as noise cleaning and crest factor reduction (CFR), since it requires very high sampling rate which is not practical for existing hardware. This is mainly due to the fact that the instantaneous bandwidth of the up-converted digital signal, which is defined as the total bandwidth encompassing all the carriers of the up-converted digital signal, is very wide and that, according to Nyquist sampling theorem, the required sampling rate need to be greater than the instantaneous bandwidth.

A conventional processing method, which focuses on crest factor reduction (CFR) applications, suggests reducing the sampling rate of such multi-band signals by positioning a baseband version of each of the carriers to a frequency separation between adjacent carriers of at least two channel bandwidths, thereafter, combining the position carriers into a composite signal, clipping the composite signal, repositioning each carrier of the clipped signal back into a baseband version centered at zero frequency, and positioning each carrier at its respective center frequency.

Although effective, this method supposes the explicit extraction and repositioning of each carrier of the carrier-bands so as to create the composite signal, thereby requiring the modification of current digital up-conversion units. Furthermore, this method seems to assume that all carrier-bands of the composite signal have the same bandwidth, and therefore does not address cases where carrier-bands of a composite signal have different bandwidths.

BRIEF DESCRIPTION OF THE DRAWINGS

Further details, aspects and embodiments of the proposed solution will be described, by way of example only, with reference to the drawings. In the drawings, like reference numbers are used to identify like or functionally similar elements. Elements in the figures are illustrated for simplicity and clarity and have not necessarily been drawn to scale.

FIG. 4, including

FIG. 5, including

FIG. 7, including FIGS. 7A, 7B, 7C, 7D, 7E, 7F, 7G, and 7H, is a sequence of diagrams illustrating the digital composite signal of FIG. 6 being manipulated by the folding unit of FIG. 3, according to an embodiment.

FIG. 8, including

DETAILED DESCRIPTION OF THE PREFERRED EMBODIMENTS

Embodiments of the inventive subject matter provide a multi-band bandwidth compression and expansion method, a non-transitory computer readable storage medium embodying a computer program for performing the method, a device for performing multi-band bandwidth signal compression and expansion, a system, and a radio relay/repeater, as described in the accompanying claims. Specific embodiments of the inventive subject matter are set forth in the dependent claims. These and other aspects of the inventive subject matter will be apparent from and elucidated with reference to the embodiments described hereinafter.

Figure 1:
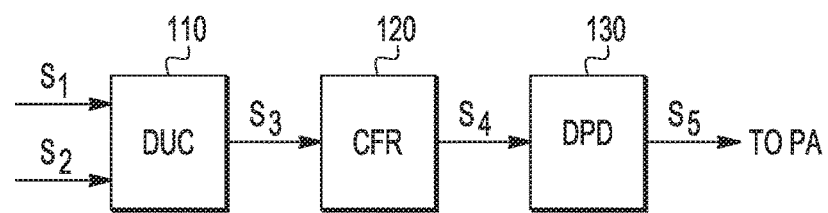
FIG. 1 is a simplified block diagram of part of a conventional digital front end of a transceiver.

FIG. 1 shows a simplified block diagram of part of a conventional digital front end (DFE) 100 of a transceiver. As shown in FIG. 1, DFE 100 comprises a digital up-conversion (DUC) unit 110, a crest factor reduction (CFR) unit 120 and a digital pre-distortion (DPD) unit 130. In FIG. 1, DUC 110 takes signal S1 and S2 as input, where signals S1 and S2 are per carrier, digital signals from baseband devices. DUC 110 up-converts the input signals, S1 and S2, into a higher sampling rate, common digital composite signal, S3. Signals S1 and S2 may comprise time-domain, in-phase/quadrature (IQ) samples associated with a given communication technology. As an example, it will be considered in the rest of the description that signals S1 and S2 correspond to LTE (Long Term Evolution) signals, respectfully associated with a first LTE carrier and a second LTE carrier, and which are intended to be transmitted using the same antenna of a LTE base station. However, other configurations of technologies are also contemplated in the subject application.

Figure 2:
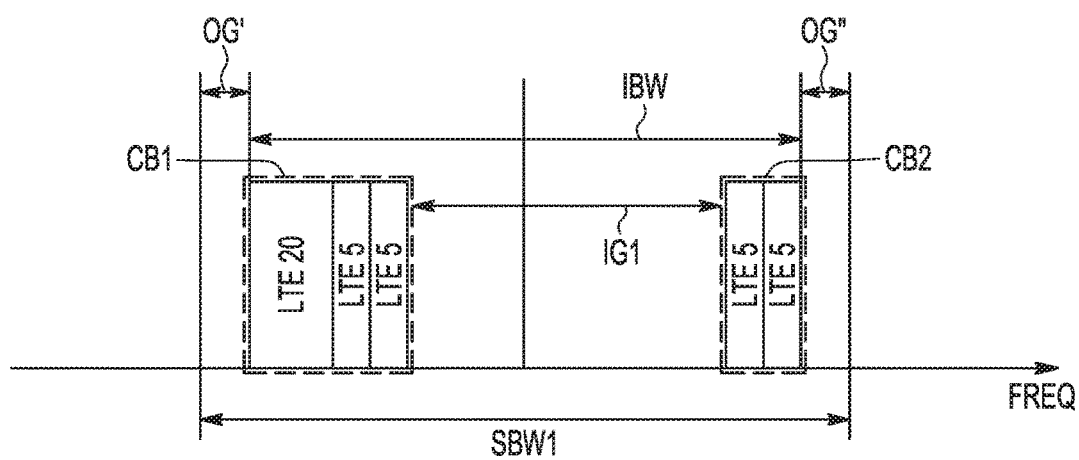
FIG. 2 is a diagram of a digital composite signal having widely separated carrier-bands, as generated by the digital up-converter of FIG. 1.

In operation, DUC 110 performs channel filtering and cleaning operations on signals S1 and S2 in order to comply with spectral mask regulations by avoiding frequency leakage between the first carrier and the second carrier. Further, DUC 110 performs cleaning, interpolation to a composite rate and multi-carrier aggregation of the input signals thereby creating a digital composite signal S3 at the composite sampling rate as shown in FIG. 2 which will be described later on. The composite sampling rate of signal S3 is chosen so that it spans over the desired spectrum. For example, if S1 and S2 correspond to bands 3 and 1 (i.e., centered at 1.8 gigahertz (GHz) and 2.1 GHz), then the instantaneous bandwidth (IBW) of composite signal S3 may be about 365 megahertz (MHz). In such a case, the composite sampling rate of S3 would be higher than the IBW, such as, for example, about 491 Msps (mega samples per second). Further in operation, CFR 120 performs peak to average power ratio reduction on the digital composite signal S3 thereby creating a clipped digital composite signal S4. Then the clipped digital composite signal S4 undergoes a digital pre-distortion process through the DPD 130 so as to generate signal S5. Finally, signal S5 passes through a digital to analog converter (not shown), then undergoes carrier modulation before entering a power amplifier (not shown).

Conventional techniques for reducing the sampling rate of signals such as signal S3, for instance, appear overcomplicated due to need of an explicit extraction and repositioning of each carrier of signal S3 before performing signal processing operations such as crest factor reduction (CFR), as already explained above.

FIG. 2 illustrates a frequency-domain representation of an example digital composite signal S3 as generated by DUC 110. In FIG. 2, signal S3 is generated at a first sampling rate and comprises a first carrier-band CB1 and a second carrier-band CB2. Carrier-bands CB1 and CB2 are arranged to define a first inner gap IG1 between the carrier-bands, namely between the highest frequency of CB1 and the lowest frequency of CB2. Further, signal S3 has a predetermined instantaneous bandwidth IBW which is substantially lower than a sampling bandwidth SBW1 associated with the first sampling rate. In the example of FIG. 2, CB1 comprises three sub carrier-bands, one sub carrier-band having a 20 MHz bandwidth (e.g., a Long Term Evolution (LTE) signal indicated with "LTE 20"), and the two others each having a 5 MHz bandwidth (e.g., an LTE signal indicated with "LTE 5"). Further, CB2 comprises two sub carrier-bands each having a 5 MHz bandwidth. Still further, as an example, instantaneous bandwidth IBW defines a 145 MHz bandwidth while sampling bandwidth SBW1 defines a 160 MHz bandwidth, such that inner gap IG1 defines a 105 MHz bandwidth. However, one should note that other configurations where carrier-bands are widely separated are also contemplated by the subject application (e.g., configurations with more and/or fewer sub-carrier bands per group, carrier bands and/or sub carrier-bands with bandwidths that are narrower and/or wider, instantaneous bandwidths that are narrower and/or wider, sampling bandwidths that are narrower and/or wider, and/or inner gaps that are narrower and/or wider). For example, such configurations may be found in countries like China where LTE band A and LTE band F are used simultaneously in a single remote radio unit (RRU). The same also applies in Europe where LTE band 1 and LTE band 3 can be used simultaneously in a single RRU. Furthermore, one should also note that the inventive subject matter also contemplates other configurations of the carrier-bands CB1 and CB2. For instance, each of carrier-bands CB1 and CB2 may comprise one or more sub carrier-bands.

Figure 3:
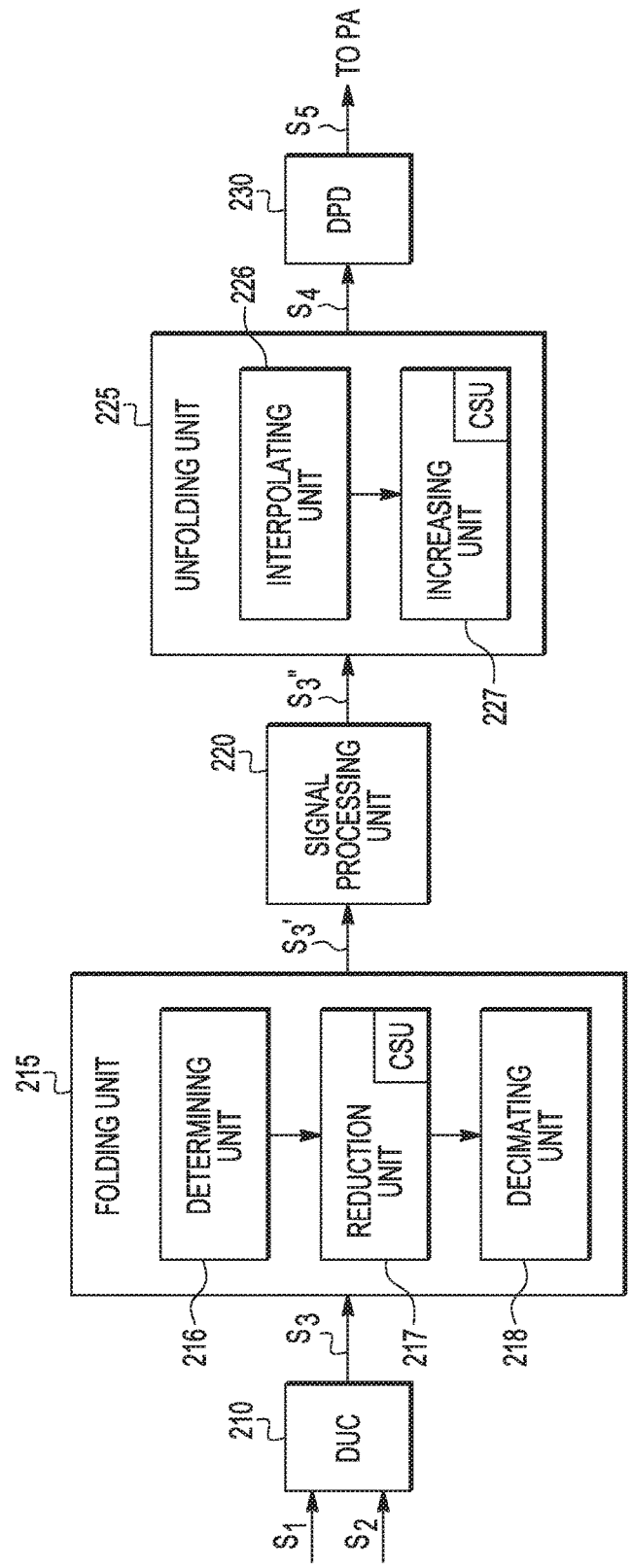
FIG. 3 is a simplified block diagram of part of a digital front end of a transceiver according to an embodiment.

FIG. 3 shows a simplified block diagram of part of a digital front end (DFE) 200 of a transceiver according to an embodiment. In FIG. 3, DUC 210, and DPD 230 are similar to their counterparts described in FIG. 1 with respect to DFE 100. DFE also comprises a signal processing unit (SP) 220 which will be considered as a crest factor reduction (CFR) unit in the following description. However, signal processing units that perform more and/or different signal processing functions may be included in an embodiment of a DFE without departing from the teachings of the subject application. For example, a signal processing unit for performing signal noise cleaning operations may be included.

DFE 200 further comprises a folding unit 215 and an unfolding unit 225. Folding unit 215 is operably coupled between DUC 210 and SP 220. One should note that in the example where SP 220 embodies the function of a crest factor reduction unit, one or more of the functions of folding unit 215 may be incorporated into DUC 210. In such an embodiment, DUC 210 may output the carrier signal at the folded positions directly at a reduced sampling rate, as described below. Furthermore, unfolding unit 125 is operably coupled between SP 220 and DPD 230. However, one or more of the functions of unfolding unit 225 may be incorporated in SP 220 and/or DPD 230, in other embodiments, without departing from the teachings of the subject application. In operation, folding unit 215 receives digital composite signal S3 as an input signal and performs various folding operations (described in detail below) to generate digital composite signal S3', which is provided as an input signal to SP 220. SP 220 then performs one or more signal processing operations on signal S3' (e.g., CFR, signal noise cleaning, and/or other operations), and generates processed digital composite signal S3", which is provided as an input signal to unfolding unit 225. Finally, unfolding unit 225 performs various unfolding operations (described in detail below) to generate unfolded digital composite signal S4, which is provided as an input signal to DPD 230 as explained above.

Referring to FIG. 3, folding unit 215 comprises a determining unit 216 and a reduction unit 217. Determining unit 216 of folding unit 215 is configured for determining an outer gap OG (i.e., ranges of frequencies) located outside the predetermined instantaneous bandwidth IBW and within the sampling bandwidth SBW1. As can be seen in FIG. 2, the width of the outer gap OG corresponds to the sum of the width of a first outer gap OG' (i.e., a first range of frequencies) and the width of a second outer gap OG" (i.e., a second range of frequencies), where OG' is located at the left end of FIG. 2 adjacent to the range of frequencies defining IBW, and OG" is located at the right end of FIG. 2 adjacent to the range of frequencies defining IBW. Namely, OG' corresponds to the difference between the lowest frequency of sampling bandwidth SBW1 and the lowest frequency of CB1. Further, OG" corresponds to the difference between the highest frequency of sampling bandwidth SBW1 and the highest frequency of CB2.

Figure 4A:
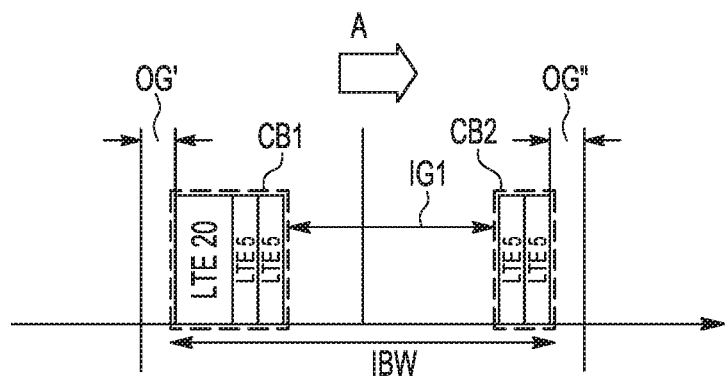
FIGS. 4A, 4B, 4C, and 4D, is a sequence of diagrams illustrating the digital composite signal of FIG. 2 being manipulated by the folding unit of FIG. 3, according to an embodiment.
Figure 4B:
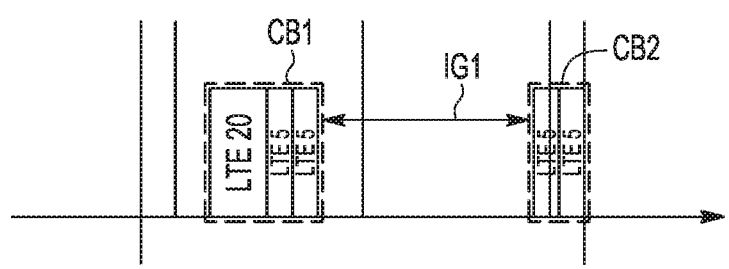
Figure 4C:
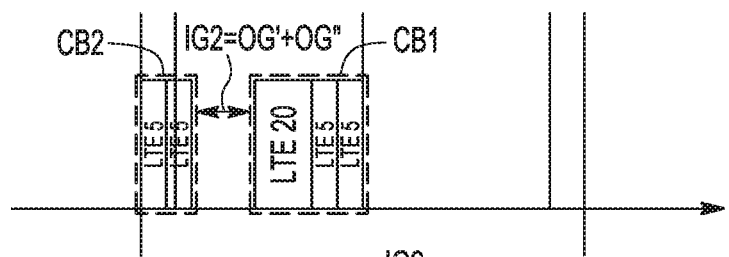
Figure 4D:
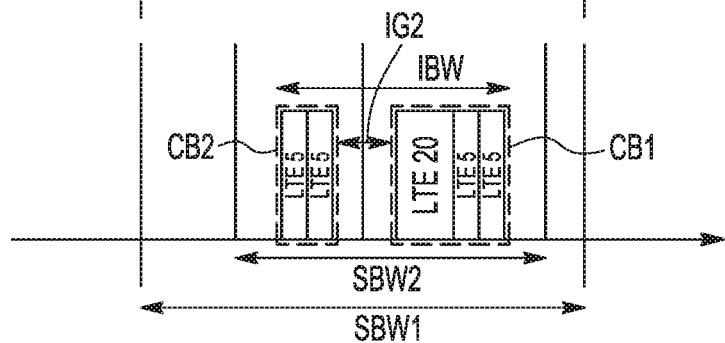
Figure 5A:
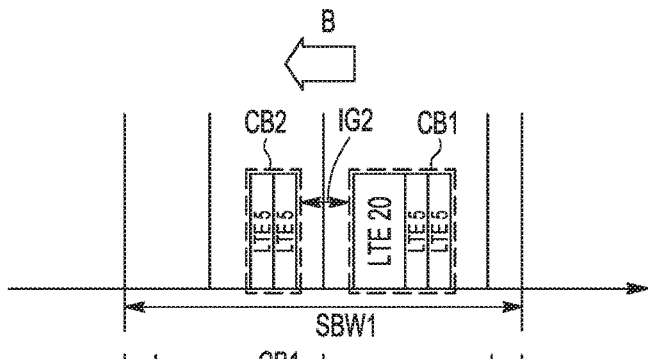
FIGS. 5A, 5B, 5C, and 5D, is a sequence of diagrams illustrating the digital composite signal of FIG. 4(d) after being processed by the signal processing unit of FIG. 3 and being manipulated by the unfolding unit of FIG. 3, according to an embodiment.
Figure 5B:
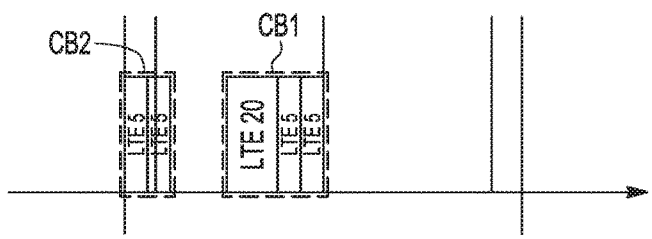
Figure 5C:
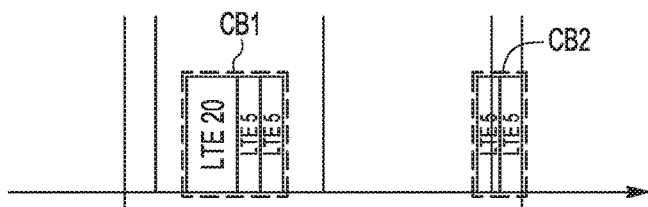
Figure 5D:
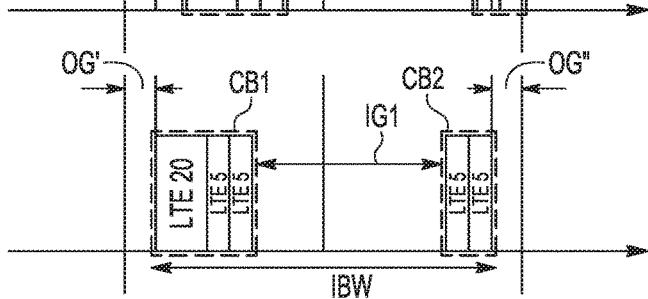

Reduction unit 217 of folding unit 215 is configured for reducing a first inner gap IG1 (i.e., a range of frequencies between the highest frequency of CB1 and the lowest frequency of CB2) in order to define a second inner gap IG2 (e.g., as shown in FIG. 4B) between carrier-bands CB1 and CB2, where the size of the second inner gap IG2 is equal to the size of the outer gap OG. Such reduction of first inner gap IG1 of signal S3 has the effect of creating a folded version of digital composite signal S3, hereinafter referred to as folded digital composite signal S3' (FIG. 3).

In an embodiment, reduction unit 217 includes a frequency circular shift unit (CSU) for circularly shifting carrier-bands CB1 and CB2 in the frequency domain within the sampling bandwidth SBW1, by performing at least one circular frequency shift operation on the signal S3. In other words, at least one circular frequency shift operation is performed to shift the carrier-bands CB1 and CB2 through a circular buffer that has a width equal to the sampling bandwidth SBW1. In an example, the circular shift unit of the reduction unit is configured to circularly shift carrier-bands CB1 and CB2 in a direction A, from the lowest to the highest frequency of sampling bandwidth SBW1. In an alternate embodiment, the circular shift unit may be configured to circularly shift carrier-bands CB1 and CB2 in an opposite direction (e.g., in direction B of FIG. 5). In either embodiment, the circular shift unit may comprise a numerically controlled oscillator (NCO) phase ramp arranged for implementing the circular frequency shift(s).

Referring to FIG. 4, there is shown a sequence of diagrams illustrating a frequency-domain representation of signal S3 of FIG. 2 being manipulated by folding unit 215, according to an embodiment. FIG. 4A corresponds to FIG. 3, which is signal S3 as generated by DUC 210. In FIG. 4B, signal S3 is frequency shifted (e.g., by reduction unit 217) in direction A by a distance equal to the width of OG" according to a first circular frequency shift operation. In FIG. 4C, signal S3 is further frequency shifted in direction A by a distance equal to the width of CB2 according to a second circular frequency shift operation. One can notice that from FIG. 4B to FIG. 4C, carrier-band CB2 has been moved from the right end of sampling bandwidth SBW1 to the left end of sampling bandwidth SBW1. This particular wrap-around effect is due to the circular frequency shift operation applied to signal S3 of FIG. 4B within the range of sampling bandwidth SBW1. In addition, it can be seen that the width of the gap between CB2 and CB1 (i.e., the width of the frequency range between the highest frequency of CB2 and the lowest frequency of CB1), or IG2, is equal to the sum of the widths of OG' and OG". The above-described circular frequency shift operations applied to signal S3 result in the folded digital composite signal S3' of FIG. 3. In FIG. 4D, as an option, signal S3' and/or IG2 can be centered at a center frequency of the instantaneous bandwidth IBW. One can notice that the instantaneous bandwidth IBW signal of S3' of FIG. 4D is reduced in width, in comparison with the instantaneous bandwidth IBW of signal S3 of FIG. 4A. The reduced size of the instantaneous bandwidth IBW of signal S3' means that a second sampling rate may be applied to signal of S3' of FIG. 4D, where the second sampling rate may be substantially lower than the first sampling rate used to sample signal S3 of FIG. 4A. To reduce the sampling rate, folding unit 215 further comprises a decimating unit 218 for decimating signal S3' from the first sampling rate to the second sampling rate. At that point, the sampling rate has been reduced and potential signal processing operations such a noise cleaning or crest factor reduction (CFR) may be performed by signal processing unit 220 at a reduced sample rate, when compared with the sampling rate that would be employed without the folding and decimating operations of the above-described embodiment. In FIG. 4D, a sampling bandwidth SBW2 associated with the second sampling rate can be seen. Further, one can also notice that in FIG. 4D, carrier-bands CB1 and CB2 have switched position within the frequency band in comparison to their positions in FIG. 4A. This is due to the circular frequency shift operations that have been applied to signal S3.

Referring back to FIG. 3, the signal processing unit 220 receives and processes signal S3', resulting in processed signal S3". Processed signal S3" is provided to unfolding unit 225, which comprises an interpolating unit 226 and an increasing unit 227. Interpolating unit 226 of unfolding unit 225 is configured for interpolating the processed digital composite signal S3" of FIG. 3 at the first sampling rate thereby creating an interpolated digital composite signal. One should note that the interpolation ratio can be any suitable ratio, such as an integer or a fractional rate ratio (e.g., 5/4, 9/4).

Increasing unit 227 of unfolding unit 225 is configured for increasing second inner gap IG2 of the interpolated digital composite signal by an amount equal to an amount by which the first inner gap IG1 was reduced by the reduction unit 217 of folding unit 215. Coupled with the below-described circular shift operations, increasing second inner gap IG2 of the interpolated digital composite signal back to the width of IG1 has the effect of creating signal S4 of FIG. 3.

In an embodiment, the increasing unit 227 comprises a circular shift unit (CSU) for circularly shifting carrier-bands CB1 and CB2 in the frequency domain within the sampling bandwidth SBW1, by performing at least one circular frequency shift operation on the interpolated digital composite signal. In other words, at least one circular frequency shift operation is performed to shift the carrier-bands CB1 and CB2 through a circular buffer that has a width equal to the sampling bandwidth SBW1. In an example, the circular shift unit of the increasing unit is configured to circularly shift carrier-bands CB1 and CB2 in a direction B, from the highest to the lowest frequency of the sampling bandwidth. In an alternate embodiment, particularly an embodiment in which the previously-described folding operation shifted the carrier-bands CB1 and CB2 in direction B, the circular shift unit may be configured to circularly shift carrier-bands CB1 and CB2 in an opposite direction (e.g., in direction A of FIG. 4). In either embodiment, the circular shift unit may comprise a numerically controlled oscillator (NCO) phase ramp arranged for generating the circular frequency shift(s).

Referring to FIG. 5, there is shown a sequence of diagrams illustrating a frequency-domain representation of signal S3" of FIG. 3 being manipulated by unfolding unit 225, according to an embodiment. FIG. 5A corresponds to S3" as generated by SP 220 and interpolated by the interpolating unit 226 of unfolding unit 225. In FIG. 5B, signal S3" is frequency shifted (e.g., by increasing unit 227) in direction B by a distance equal to the width of the outer gap between the lowest frequency of CB2 and the lowest frequency of SBW1 according to a first circular frequency shift operation. In FIG. 5C, signal S3" is further frequency shifted in direction B by a distance equal to the width of CB2 according to a second circular frequency shift operation. One can notice that from FIG. 5B to FIG. 5C, carrier-band CB2 has moved from the left end of sampling bandwidth SBW1 to the right end of sampling bandwidth SBW1. This particular wrap-around effect is due to the circular frequency shift operation applied to signal S3" of FIG. 5B within the range of sampling bandwidth SBW1, as explained above. In addition, it can be seen that the width of the gap between CB1 and CB2 (i.e., the width of the frequency range between the highest frequency of CB1 and the lowest frequency of CB2), or IG1, has been increased by the by the amount that the first inner gap IG1 was reduced by the reduction unit 217 of folding unit 215 during the previously-described signal folding operation. In FIG. 5D, as an option, signal S3″ can be centered at a center frequency of the instantaneous bandwidth IBW. The above-described circular frequency shift operations applied to signal S3″ result in the unfolded digital composite signal S4 of FIG. 3. Further, in FIG. 5D, one would notice that carrier-bands CB1 and CB2 have return to their original positions within the frequency band (e.g., the positions depicted in FIG. 4A).

One would note that the proposed embodiments may bring improvements over conventional multi-band bandwidth compression and expansion solutions. The proposed embodiments may operate directly on a digital composite signal as generated by a conventional digital up-converter. Implementation of a proposed embodiment may avoid modification of conventional digital up-conversion units as may be the case in a conventional system that may perform explicit extraction and repositioning of each carrier so as to create a composite signal. Further, the proposed embodiments also address cases where carrier-bands of the composite signal have different bandwidths. Indeed, as can be seen from the foregoing, the proposed embodiments do not assume that carrier-bands CB1 and CB2 have the same bandwidth, although they may. Therefore, different bandwidths may be used for carrier-bands CB1 and CB2, using the proposed embodiments. Of course, the above advantages are exemplary, and these or other advantages may be achieved by the proposed embodiments. Further, one of skill in the art will appreciate that not all advantages stated above are necessarily achieved by embodiments described herein.

For example, DFE 200 has been described as operating on a digital composite signal comprising two carrier-bands. However, embodiments of DFE systems that operate on digital composite signals comprising more than two carrier-bands are also included within the scope of the inventive subject matter. This means that a digital composite signal comprising three, four, five or more carrier-bands can also be operated upon using embodiments of the proposed methods and apparatus.

Figure 6:
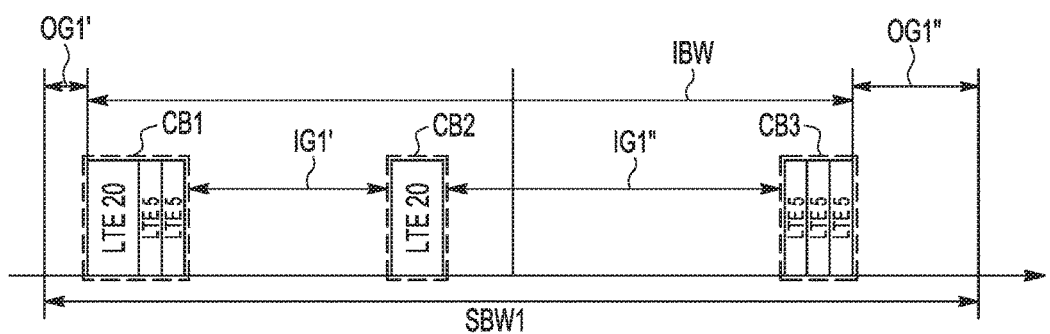
FIG. 6 is another diagram of a digital composite signal as generated by the digital up-converter of FIG. 1.

As an example, FIG. 6 illustrates a diagram of digital composite signal S3 as generated by DUC 210 which comprises three carrier-bands (e.g., carrier bands associated with each of signals S1, S2, and S3 input to the DUC 210). In FIG. 6, signal S3 is generated at a first sampling rate and comprises a first carrier-band CB1, a second carrier-band CB2, and a third carrier-band CB3. Carrier-bands CB1, CB2 and CB3 are arranged to define a first inner gap IG1 between the carrier-bands where first inner gap IG1 comprises a first gap IG1′ and a second gap IG1″ defined between the carrier-bands. Namely, first gap IG1′ has a width that is defined between the highest frequency of CB1 and the lowest frequency of CB2 and second gap IG1″ has a width that is defined between the highest frequency of CB2 and the lowest frequency of CB3. Further, signal S3 has a predetermined instantaneous bandwidth IBW which is substantially lower than a sampling bandwidth SBW1 associated with the first sampling rate.

With reference to FIG. 3, determining unit 216 of folding unit 215 is configured for determining an outer gap OG1 located outside the predetermined instantaneous bandwidth IBW and within the sampling bandwidth SBW1. As can be seen in FIG. 6, outer gap OG1 corresponds to the sum of outer gap OG1′ and outer gap OG1″, where OG1′ is located at the left end of FIG. 6 and OG1″ is located at the right end of FIG. 6. Namely, the width of OG1′ corresponds to the difference between the lowest frequency of sampling bandwidth SBW1 and the lowest frequency of CB1. Further, the width of OG1″ corresponds to the difference between the highest frequency of sampling bandwidth SBW1 and the highest frequency of CB3.

Referring now to FIG. 7, there is shown a sequence of diagrams illustrating a frequency-domain representation of signal S3 of FIG. 6 being manipulated by folding unit 215, according to an embodiment. FIG. 7A corresponds to signal S3 as generated by the DUC 210 (FIG. 3). In FIG. 7B, signal S3 is frequency shifted in direction A by a distance equal to the width of OG1″, according to a first circular frequency shift operation. In FIG. 7C, signal S3 is further frequency shifted in direction A by a distance equal to the width of CB3, according to a second circular frequency shift operation. One can notice that from FIG. 7B to FIG. 7C, carrier-band CB3 has moved from the right end of sampling bandwidth SBW1 to the left end of sampling bandwidth SBW1. This particular wrap-around effect has already been explained above. Further, from FIG. 7A to 7C, the reduction unit 217 of folding unit 215 is used to reduce the first inner gap IG1 in order to define a second inner gap IG2 between carrier-bands CB1, CB2 and CB3. In FIG. 7C, one can notice that second inner gap IG2 comprises a first gap IG2′ defined between the highest frequency of carrier-band CB3 and the lowest frequency of carrier-band CB1, where the first gap IG2′ has a width is equal to the width of outer gap OG1 (i.e., a sum of the widths of OG1′ and OG1″). After the above-described circular frequency shift operations have been applied to signal S3, such reduction of first inner gap IG1 of signal S3 has the effect of creating an intermediate folded version of digital composite signal S3. In FIG. 7D, as an option, the intermediate folded digital composite signal of FIG. 7C can be centered at a center frequency of instantaneous bandwidth IBW. One can notice that in FIG. 7D, instantaneous bandwidth IBW of the intermediate folded digital composite signal of FIG. 7D is reduced in comparison with instantaneous bandwidth IBW of signal S3 of FIG. 7A. In FIG. 7E, the size of instantaneous bandwidth IBW of intermediate folded digital composite signal allows the use of a second sampling rate which is substantially lower than the first sampling rate used to generate signal S3 of FIG. 7A. For that purpose, the decimating unit 218 of folding unit 215 may be used as already explained above. Alternatively, the signal S3 can be further folded.

In FIG. 7E, it can be seen a sampling bandwidth SBW2 associated with the second sampling rate and which is substantially lower than sampling bandwidth SBW1. Further in FIG. 7E, determining unit 216 of folding unit 215 is configured for determining an outer gap OG2 located outside the predetermined instantaneous bandwidth IBW and within the sampling bandwidth SBW2. As can be seen in FIG. 7E, the width of outer gap OG2 corresponds to the sum of the width of outer gap OG2′ and the width of outer gap OG2″, where OG2′ is located at the left end of FIG. 7E and OG2″ is located at the right end of FIG. 7E. Namely, the width of OG2′ corresponds to the difference between the lowest frequency of sampling bandwidth SBW2 and the lowest frequency of carrier-band CB3. Further, the width of OG2″ corresponds to the difference between the highest frequency of sampling bandwidth SBW2 and the highest frequency of carrier-band CB2. In FIGS. 7F and 7G, signal S3 is further frequency shifted in direction A according to further circular frequency shift operations, where a first frequency shift operation indicated in FIG. 7F includes a frequency shift in direction A by a distance equal to the width of OG2″, and a second frequency shift operation indicated in FIG. 7G includes a frequency shift in direction A by a distance equal to the width of CB2. One can notice that from FIG. 7F to FIG. 7G, carrier-band CB2 has moved from the right end of sampling bandwidth SBW2 to the left end of sampling bandwidth SBW2. This particular wrap-around effect has already been explained above. From FIG. 7F to 7G, the reduction unit 217 of folding unit 215 is used to further reduce the first inner gap IG1 in order to further define third inner gap IG3 between carrier-bands CB1, CB2 and CB3. In FIG. 7G, one can notice that the third inner gap IG2 comprises a first gap IG2' and a second gap IG2", where the second gap IG2" has a width equal to a distance between the highest frequency of carrier-band CB2 and the lowest frequency of carrier-band CB3, and the width of the second gap IG2" is equal to the width of outer gap OG2 (i.e., a sum of the widths of OG2' and OG2"). In FIG. 7H, after appropriate circular frequency shift operations have been applied to the intermediate folded digital composite signal, there is obtained the folded digital composite signal S3' of FIG. 3. In FIG. 7H as an option, the folded digital composite signal can be centered at a center frequency of the instantaneous bandwidth IBW. One can notice that instantaneous bandwidth IBW signal of S3' of FIG. 7H is reduced in comparison with instantaneous bandwidth IBW of the intermediate folded digital composite signal of FIG. 7D, and is even further reduced in comparison with instantaneous bandwidth IBW of the digital composite signal of FIG. 7A. The size of instantaneous bandwidth IBW of signal S3' allows a third sampling rate to be applied to the signal of FIG. 7H, where the third sampling rate is substantially lower than the second sampling rate used to sample intermediate folded digital composite signal of FIG. 7D, and even more substantially lower than the first sampling rate used to sample the digital composite signal of FIG. 7A. For that purpose, the decimating unit 218 of folding unit 215 may be used as already explained above. In FIG. 7H, a sampling bandwidth SBW3 associated with the third sampling rate can be applied. Further, one can also notice that in FIG. 7H, carrier-bands CB1, CB2 and CB3 have switched positions within the frequency band in comparison to their positions in FIG. 7A. This is due to the circular frequency shift operations that have been applied signal S3.

From the foregoing, it can be understood that, when the DFE 200 is used to process a digital composite signal S3 comprising more than two carriers, the determining unit 216 and the reduction unit 218 of the folding unit 215 may be used several times so as to obtain signal S3' of FIG. 3.

Figures 8A, 8B, 8C, 8D, 8E, 8F, 8G:
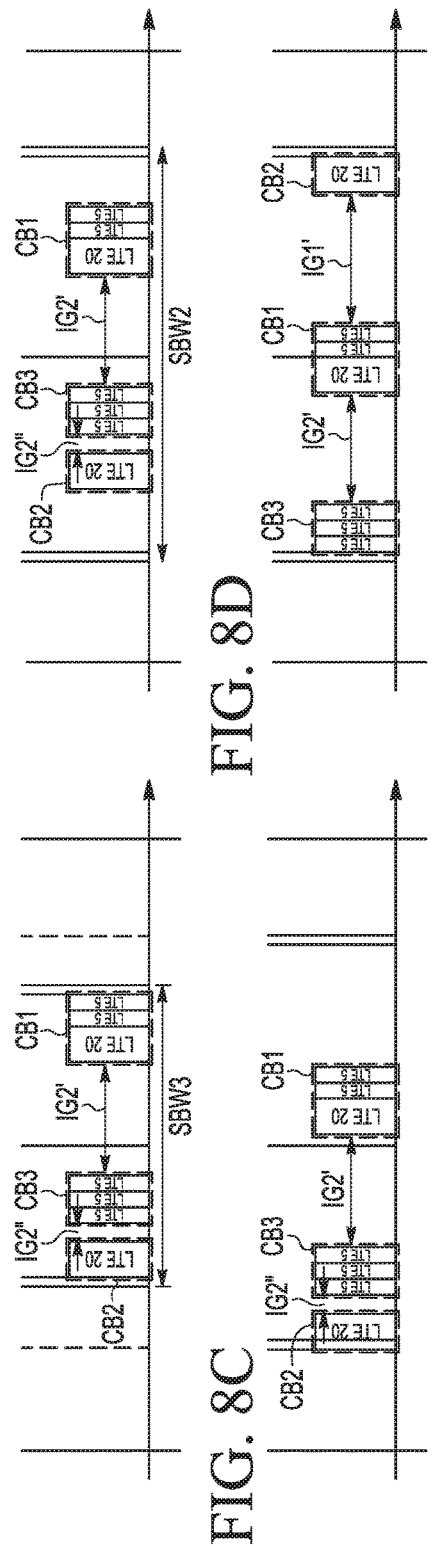
FIGS. 8A, 8B, 8C, 8D, 8E, 8F, and 8G, is a sequence of diagrams illustrating the digital composite signal of FIG. 7(f) after being processed by the signal processing unit of FIG. 3 and being manipulated by the unfolding unit of FIG. 3, according to an embodiment.

After processing of signal S3 by the signal processing unit 220 (FIG. 3) to produce a processed folded digital composite signal S3", and referring to FIG. 8, there is shown a sequence of diagrams illustrating a frequency-domain representation of signal S3" of FIG. 3 being manipulated by unfolding unit 225, according to an embodiment. FIG. 8A corresponds to S3" as generated by SP 220. In FIG. 8B, there is shown the processed signal as interpolated at the second sampling rate, SBW2, by the interpolating unit 226 of unfolding unit 225. In FIG. 8C, signal S3" is frequency shifted in direction B by a distance equal to the difference between the lowest frequency of CB2 and the lowest frequency of SBW2, according to a first circular frequency shift operation. In FIG. 7D, signal S3" is further frequency shifted in direction B by a distance equal to a width of CB2 and a width of OG2", according to additional circular frequency shift operations. One can notice that from FIG. 7C to FIG. 7D, carrier-band CB2 has moved from the left end of sampling bandwidth SBW2 to the right end of sampling bandwidth SBW2. This particular wrap-around effect has already been explained above. In FIG. 7D, after appropriate circular frequency shift operations have been applied to signal S3" there is obtained an intermediate unfolded version of the digital composite signal S3" of FIG. 3. In FIG. 7E, the intermediate unfolded digital composite signal is interpolated at the first sampling rate, SBW1, by the interpolating unit 226 of unfolding unit 225. In FIGS. 7F and 7G, after additional circular frequency shift operations have been applied to intermediate unfolded digital composite signal of FIG. 7E, there is obtained signal S4 of FIG. 3, where a first frequency shift operation indicated in FIG. 8F includes a frequency shift in direction B by a distance equal to the distance between the lowest frequency of CB3 and the lowest frequency of SBW1, and second and third frequency shift operations indicated in FIG. 8G including frequency shifts in direction B by distances equal to the width of CB3 and then the width of OG1". As discussed previously, in other embodiments, the circular shift directions implemented by the folding unit 215 and the unfolding unit 225 could be reversed (i.e., folding unit 215 may shift signals in direction B while unfolding unit 225 may shift signals in direction A).

From the foregoing, it can be understood that where a digital composite signal S3 comprising more than two carriers is processed by an embodiment of DFE 200, the interpolating unit 226 and the increasing unit 227 of unfolding unit 225 may be used several times so as to obtain signal S4 of FIG. 3.

Figure 9:
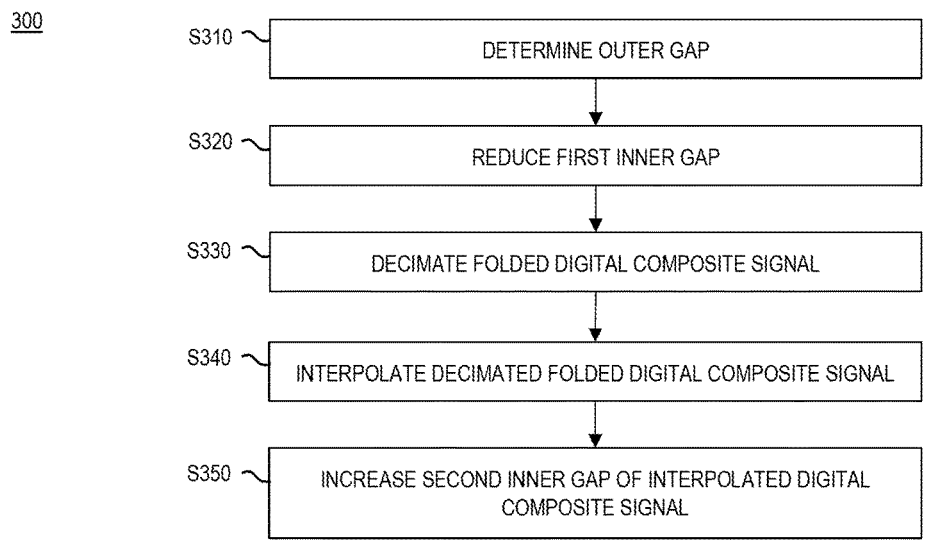
FIG. 9 is a flow chart of a method according to an embodiment.

Further, as shown in FIG. 9, embodiments of the proposed solution may also be implemented for performing a signal processing operation on signal S3 of FIG. 3, such as a crest factor reduction (CFR) operation, a noise cleaning operation, and/or other operations. Such method may include:
  at S310, determining an outer gap located outside the instantaneous bandwidth and within the sampling bandwidth;
  at S320, reducing a first inner gap in order to define a second inner gap between the carrier-bands corresponding to the determined outer gap, thereby creating a folded digital composite signal;
  at S330, decimating the folded digital composite signal to a second sampling rate lower than the first sampling rate, thereby creating a decimated folded digital composite signal;
  at S340, interpolating the decimated folded digital composite signal to the first sampling rate thereby creating an interpolated, folded digital composite signal; and
  at S350, increasing the second inner gap of the interpolated digital composite signal by an amount equal to the amount by which the first inner gap was reduced in S320.

In FIG. 9, at least one signal processing operation can be performed between, for instance, S330 and S340. In the example of crest factor reduction or noise cleaning, the signal processing operation may be performed on the decimated folded digital composite signal.

In embodiments of the method, the digital composite signal further comprises a signal component in a third carrier-band arranged such that the first inner gap further comprises a second gap between the highest frequency of the second carrier-band and the lowest frequency of the third carrier-band.

In one embodiment of the method, the reducing and/or increasing processes further comprise circularly shifting the carrier-bands in the frequency domain within the sampling bandwidth, by applying at least one circular frequency shift operation to the digital composite signal. In an example, the circular shift operation(s) further include:

circularly shifting the carrier-bands from the lowest to the highest frequency of the sampling bandwidth, during the reducing operation, and circularly shifting the carrier-bands from the highest to the lowest frequency of the sampling bandwidth, during the increasing operation, or vice versa.

In such example, the circular shift operations may further comprise generating each circular frequency shift using a numerically controlled oscillator phase ramp operation.

In embodiments of the method, there is repeated the interpolating and the increasing operations a plurality of times. Further, in other embodiments of the method, there is repeated the determining and the reducing operations a plurality of times.

In other embodiments of the method, the reducing and the interpolating operations further comprise centering the folded digital composite signal at a center frequency of the instantaneous bandwidth.

The above-proposed method may also be performed by a computer program embodied in a non-transitory computer readable storage medium.

One potential field of application of the embodiments of the innovative subject-matter responds to the need for radio relays or repeaters (also known as distributed antenna systems, DAS) to manipulate an input composite signal as a whole without having ready access to each carrier of the input composite signal. This is to be opposed to base station units having modems where each carrier of a composite signal to be transmitted is readily available. For example, in a conventional base station unit, a digital up-conversion (DUC) unit such as DUC 110 is used to perform channel filtering and cleaning of each carrier at a time so as to conform to the subsequent regulatory spectral emission mask. Therefore, each carrier can be manipulated separately without requiring complex signal processing. This may not be the case with a radio relay or a repeater. In contrast, the relay/repeater may receive a signal transmitted from a base station unit, amplify the received signal, and then retransmit the amplified signal. However, in the context of the subject application, the received composite signal may comprise carrier-bands separated by one or more significant frequency bandwidth gaps. For instance, it is known that a dual-band relay/repeater is configured to receive a composite signal comprising two carrier-bands. In order to reduce the complexity of the signal processing in a relay/repeater, it may be appropriate to perform signal processing on a folded version of the received composite signal, as explained above in conjunction with a description of the various embodiments. Hence, in one embodiment, a radio relay/repeater may comprise a folding unit 215 and an unfolding unit 225, as explained above. In such an embodiment of a radio relay/repeater, the received composite signal may first be folded by the folding unit 215 before signal processing operations are applied by the radio relay/repeater. Then the processed signal may be unfolded by the unfolding unit 225 before being retransmitted by the radio relay/repeater.

Figure 10:
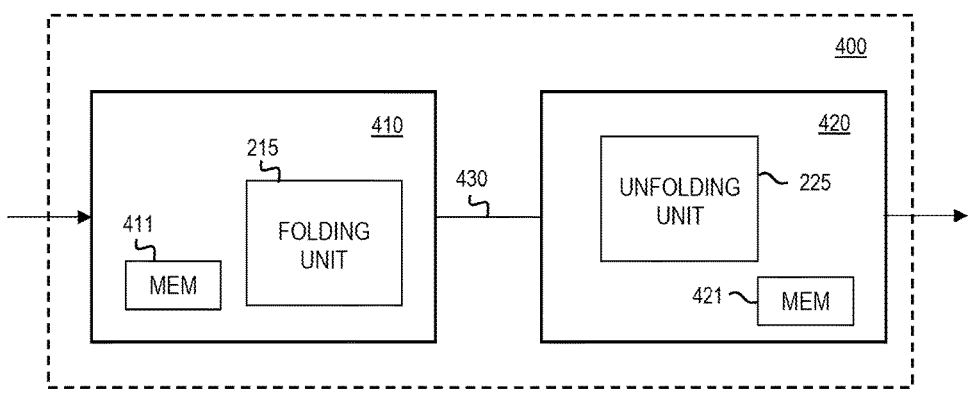
FIG. 10 is a block diagram of a system comprising the folding unit and the unfolding unit of FIG. 3 according to an embodiment.

Another potential field of application of the embodiments of the innovative subject-matter responds to the need for reducing the sampling rate of a composite signal so as to save memory and/or limit traffic conveyed over a restricted communication interface of a given system. This could be useful, for instance, for systems where signal processing operations are separated over a plurality of processing units (e.g., operation A is performed on a first processor, and operation B is performed on a second processor). In that case, there may be memory limitations on each processing unit and/or traffic limitations on the communication interface that interfaces the processing units. Hence, in an embodiment, as shown in FIG. 10, embodiments of the proposed solution may also be implemented in a system 400. In FIG. 10, system 400 includes a first processing unit 410 comprising a first memory 411 and a folding unit 215 of FIG. 3 as described above. In first processing unit 410, folding unit 215 may be used to reduce the sampling rate of an input signal before being processed by a signal processing operation, and the folded signal may be decimated and saved to first memory 411. System 400 further includes a second processing unit 420 comprising a second memory 421 and an unfolding unit 225 of FIG. 3 as described above. Further, system 400 includes a communication interface 430 for interfacing first and second processing units 410, 420. For example, the communication interface 430 may be one or several of serial and/or parallel communication interfaces. System 400 may further include a transferring unit (not shown) for transferring the decimated folded digital signal S3' and/or S3" from FIG. 3, through the communication interface 430, from the first memory 411 to the second memory 421. This has the advantage of transferring a compressed signal over the communication interface 430 which may be limited in traffic carrying capacity. In the second processing unit 420, the unfolding unit 225 may be used to increase the sampling rate of the compressed signal before being saved to second memory 421. Finally, as already explained above, the first and/or second processing units may be further configured for performing at least one signal processing operation on the decimated folded digital signal.

In one example of the foregoing embodiments, part of the features of system 400 may be distributed between two separate units. For instance, a first unit may include first processing unit 410 and a second unit may include second processing unit 420.

In the foregoing specification, the proposed solution has been described with reference to specific examples of embodiments of the proposed solution. It will, however, be evident that various modifications and changes may be made therein without departing from the broader scope of the proposed solution as set forth in the appended claims. For instance, one should note that in the proposed solution, each of the carrier-bands comprise carriers that may be associated with a communication system protocol, such as: second generation (2G), third generation (3G), fourth generation (4G), fifth generation (5G) wireless systems, other new generation of wireless systems or a mix of such communication systems.

Embodiments of multi-band compression methods for a digital composite signal generated at a first sampling rate are described herein, where the digital composite signal includes a first carrier-band and a second carrier-band arranged to define a first inner gap between the carrier-bands, the first inner gap comprising at least a first gap between the highest frequency of the first carrier-band and the lowest frequency of the second carrier-band. The digital composite signal has a predetermined instantaneous bandwidth that is substantially lower than a sampling bandwidth associated with the first sampling rate. The method comprises determining an outer gap located outside the instantaneous bandwidth and within the sampling bandwidth, reducing the first inner gap in order to define a second inner gap between the carrier-bands corresponding to the determined outer gap thereby creating a folded digital composite signal, and decimating the folded digital composite signal at a second sampling rate lower than the first sampling rate thereby creating a decimated folded digital composite signal.

Embodiments of multi-band expansion methods also have been described for a digital composite signal generated at a first sampling rate, the digital composite signal comprising a first carrier-band and a second carrier-band arranged to define a first inner gap between the carrier-bands, the first inner gap comprising at least a first gap between the highest frequency of the first carrier-band and the lowest frequency of the second carrier-band, the digital composite signal having a predetermined instantaneous bandwidth substantially lower than a sampling bandwidth associated with the first sampling rate, said digital composite signal having been processed so as to reduce the first inner gap in order to define a second inner gap between the carrier-bands corresponding to a determined outer gap located outside the instantaneous bandwidth and within the sampling bandwidth thereby creating a folded digital composite signal, said folded digital composite signal having been sampled at a second sampling rate lower than the first sampling rate thereby creating a decimated folded digital composite signal. The method comprises interpolating the decimated folded digital composite signal at the first sampling rate thereby creating an interpolated digital composite signal; and increasing the second inner gap of the interpolated digital composite signal by the amount used to reduce the first inner gap.

Embodiments of a signal compression device for performing multi-band compression to a digital composite signal generated at a first sampling rate also have been described, the digital composite signal comprising a first carrier-band and a second carrier-band arranged to define a first inner gap between the carrier-bands, the first inner gap comprising at least a first gap between the highest frequency of the first carrier-band and the lowest frequency of the second carrier-band, the digital composite signal having a predetermined instantaneous bandwidth substantially lower than a sampling bandwidth associated with the first sampling rate. Embodiments of the device comprise a determining unit for determining an outer gap located outside the instantaneous bandwidth and within the sampling bandwidth, a reduction unit for reducing the first inner gap in order to define a second inner gap between the carrier-bands corresponding to the determined outer gap thereby creating a folded digital composite signal, and a decimating unit for decimating the folded digital composite signal at a second sampling rate lower than the first sampling rate thereby creating a decimated folded digital composite signal.

Embodiments of a signal expansion device for performing multi-band expansion to a digital composite signal generated at a first sampling rate also have been described, the digital composite signal comprising a first carrier-band and a second carrier-band arranged to define a first inner gap between the carrier-bands, the first inner gap comprising at least a first gap between the highest frequency of the first carrier-band and the lowest frequency of the second carrier-band, the digital composite signal having a predetermined instantaneous bandwidth substantially lower than a sampling bandwidth associated with the first sampling rate, said digital composite signal having been processed so as to reduce the first inner gap in order to define a second inner gap between the carrier-bands corresponding to a determined outer gap located outside the instantaneous bandwidth and within the sampling bandwidth thereby creating a folded digital composite signal, said folded digital composite signal having been sampled at a second sampling rate lower than the first sampling rate thereby creating a decimated folded digital composite signal. The device comprises an interpolating unit for interpolating the decimated folded digital composite signal at the first sampling rate thereby creating an interpolated digital composite signal; and an increasing unit for increasing the second inner gap of the interpolated digital composite signal by the amount used to reduce the first inner gap.

Embodiments of a transceiver also have been described comprising a transmitting device comprising a first memory and a folding unit, a receiving device comprising a second memory and an unfolding unit, and a communication interface configured to interface the transmitting device to the receiving device.

Embodiments of a device may be embodied as a hardware module and/or integrated circuit that include various processing units and/or logic blocks configured to perform the functionality of the units. Embodiments of the device may be incorporated into a transmit-ter system, which also includes a power amplifier and an antenna. The power amplifier is coupled to the device to receive a multi-band signal comprising widely separated carrier-bands intended to be transmitted simultaneously (or a further processed version thereof), where the power amplifier amplifies the received signal, and provides the amplified signal to the amplifier for transmission over an air interface.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality. In addition, any above advantages are exemplary, and those or other advantages may be achieved by the proposed embodiments. Further, one of skill in the art may appreciate that not all advantages stated above are necessarily achieved by embodiments described herein.

Any arrangement of devices to achieve the same functionality is effectively "associated" such that the desired functionality is achieved. Hence, any two devices herein combined to achieve a particular functionality may be seen as "associated with" each other such that the desired functionality is achieved, irrespective of architectures or intermediate devices. Likewise, any two devices so associated can also be viewed as being "operably connected," or "operably coupled," to each other to achieve the desired functionality.

Furthermore, those skilled in the art will recognize that boundaries between the above described operations are merely illustrative. When multiple operations are discussed or illustrated, the multiple operations may be combined into a single operation, a single operation may be distributed in additional operations, and operations may be executed at least partially overlapping in time. Moreover, alternative embodiments may include multiple examples of a particular operation, and the order of operations may be altered in various other embodiments. Various other modifications, variations and alternatives are also possible. The specifications and drawings are, accordingly, to be regarded in an illustrative rather than in a restrictive sense.

In the claims, any reference signs placed between parentheses shall not be construed as limiting the claim. As used herein, the word 'comprising' does not exclude the presence of other elements or operations then those listed. Furthermore, the terms "a" or "an," as used herein, are defined as one or as more than one. Also, the use of introductory phrases such as "at least one" and "one or more" should not be construed to imply that the introduction of another element by the indefinite articles "a" or "an" limits any particular embodiment containing such introduced element to inventions containing only one such element. The same holds true for the use of definite articles. Unless stated otherwise, terms such as "first" and "second" are used to arbitrarily distinguish between the elements of an embodiment that such terms describe. Thus, these terms are not necessarily intended to indicate temporal or other prioritization of such elements.

What is claimed is:

1. A method for processing a digital composite signal generated at a first sampling rate, the method comprising:
   receiving the digital composite signal, wherein the digital composite signal includes a plurality of carrier-bands, including a first carrier-band and a second carrier-band, wherein the plurality of carrier-bands are arranged to define a first inner gap between the plurality of carrier-bands, the first inner gap comprising at least a first gap between a highest frequency of the first carrier-band and a lowest frequency of the second carrier-band, and the digital composite signal having a predetermined instantaneous bandwidth lower than a sampling bandwidth associated with the first sampling rate;
   determining an outer gap for the digital composite signal, wherein the outer gap is located outside the predetermined instantaneous bandwidth and within the sampling bandwidth;
   reducing the first inner gap in order to define a second inner gap between the plurality of carrier-bands, wherein a width of the second inner gap is related to a width of the outer gap, thereby creating a folded digital composite signal; and
   decimating the folded digital composite signal to a second sampling rate lower than the first sampling rate, thereby creating a decimated folded digital composite signal.

2. A multi-band expansion method for a digital composite signal generated at a first sampling rate, the digital composite signal comprising a first carrier-band and a second carrier-band arranged to define a first inner gap between the carrier-bands, the first inner gap comprising at least a first gap between the highest frequency of the first carrier-band and the lowest frequency of the second carrier-band, the digital composite signal having a predetermined instantaneous bandwidth substantially lower than a sampling bandwidth associated with the first sampling rate, said digital composite signal having been processed so as to reduce the first inner gap in order to define a second inner gap between the carrier-bands corresponding to a determined outer gap located outside the predetermined instantaneous bandwidth and within the sampling bandwidth thereby creating a folded digital composite signal, said folded digital composite signal having been sampled at a second sampling rate lower than the first sampling rate thereby creating a decimated folded digital composite signal, the method comprising:
   interpolating the decimated folded digital composite signal to the first sampling rate, thereby creating an interpolated digital composite signal; and
   increasing the second inner gap of the interpolated digital composite signal by an amount equal to the amount by which the first inner gap was reduced in the reducing step.

3. The method of claim 1 wherein the digital composite signal further comprises a third carrier-band arranged such that the first inner gap further comprises a second gap between a highest frequency of the second carrier-band and a lowest frequency of the third carrier-band, and wherein the method further comprises:
   repeating the determining step and the reducing step to further reduce the second inner gap to a third inner gap, and to further decimate the folded digital composite signal to a third sampling rate lower than the second sampling rate.

4. The method of claim 1 wherein the reducing step further comprises:
   circularly shifting the carrier-bands in the frequency domain within the sampling bandwidth, by performing at least one circular frequency shift operation on the digital composite signal.

5. The method of claim 4, wherein the circularly shifting further comprises:
   circularly shifting the carrier-bands from a lowest frequency to a highest frequency of the sampling bandwidth, during the reducing step.

6. The method of claim 4 wherein the circularly shifting further comprises:
   performing the circular frequency shift operation by a numerically controlled oscillator phase ramp.

7. The method of claim 1 further comprising:
   repeating the determining step and the reducing step a plurality of times.

8. The method of claim 1 further comprising:
   performing at least one signal processing operation on the decimated folded digital composite signal thereby creating a digital processed digital composite signal.

9. The method of claim 8, wherein the at least one signal processing operation is selected from a crest factor reduction operation and a noise cleaning operation.

10. A non-transitory computer readable storage medium embodying a computer program for performing a method that includes the steps of:
    receiving a digital composite signal generated at a first sampling rate, wherein the digital composite signal includes a plurality of carrier-bands, including a first carrier-band and a second carrier-band, wherein the plurality of carrier-bands are arranged to define a first inner gap between the plurality of carrier-bands, the first inner gap comprising at least a first gap between a highest frequency of the first carrier-band and a lowest frequency of the second carrier-band, and the digital composite signal having a predetermined instantaneous bandwidth lower than a sampling bandwidth associated with the first sampling rate;
    determining an outer gap for the digital composite signal, wherein the outer gap is located outside the predetermined instantaneous bandwidth and within the sampling bandwidth;
    reducing the first inner gap in order to define a second inner gap between the plurality of carrier-bands, wherein a width of the second inner gap is related to a width of the outer gap, thereby creating a folded digital composite signal; and
    decimating the folded digital composite signal to a second sampling rate lower than the first sampling rate, thereby creating a decimated folded digital composite signal.

11. A device for processing a digital composite signal generated at a first sampling rate, the digital composite signal comprising a plurality of carrier-bands, including a first carrier-band and a second carrier-band, wherein the plurality of carrier-bands are arranged to define a first inner gap between the carrier-bands, the first inner gap comprising at least a first gap between a highest frequency of the first carrier-band and a lowest frequency of the second carrier-band, the digital composite signal having a predetermined instantaneous bandwidth lower than a sampling bandwidth associated with the first sampling rate, the device comprising:
- a determining unit that receives the digital composite signal, and determines an outer gap for the digital composite signal, wherein the outer gap is located outside the predetermined instantaneous bandwidth and within the sampling bandwidth;
- a reduction unit operatively coupled to the determining unit, wherein the reduction unit reduces the first inner gap in order to define a second inner gap between the plurality of carrier-bands, wherein a width of the second inner gap is related to a width of the outer gap, thereby creating a folded digital composite signal; and
- a decimating unit operatively coupled to the reduction unit, wherein the decimating unit decimates the folded digital composite signal to a second sampling rate lower than the first sampling rate, thereby creating a decimated folded digital composite signal.

12. A signal expansion device for performing multi-band expansion to a digital composite signal generated at a first sampling rate, the digital composite signal comprising a first carrier-band and a second carrier-band arranged to define a first inner gap between the carrier-bands, the first inner gap comprising at least a first gap between the highest frequency of the first carrier-band and the lowest frequency of the second carrier-band, the digital composite signal having a predetermined instantaneous bandwidth substantially lower than a sampling bandwidth associated with the first sampling rate, the device comprising:
- an interpolating unit that processes a decimated folded digital composite signal, wherein the decimated folded digital composite signal was generated by processing the digital composite signal to reduce the first inner gap in order to define a second inner gap between the carrier-bands corresponding to a determined outer gap located outside the predetermined instantaneous bandwidth and within the sampling bandwidth thereby creating a folded digital composite signal, said folded digital composite signal having been sampled at a second sampling rate lower than the first sampling rate thereby creating the decimated folded digital composite signal, and wherein the interpolating unit processes the decimated folded digital composite signal by interpolating the decimated folded digital composite signal to the first sampling rate thereby creating an interpolated digital composite signal; and
- an increasing unit that increases the second inner gap of the interpolated digital composite signal by an amount equal to the amount by which the first inner gap was reduced by the reducing unit.

13. The device of claim 11 wherein the digital composite signal further comprises:
- a third carrier-band arranged such that the first inner gap further comprises a second gap between a highest frequency of the second carrier-band and a lowest frequency of the third carrier-band.

14. The device of claim 11 wherein the reduction unit further comprises:
- a circular shift unit that circularly shifts the carrier-bands in the frequency domain within the sampling bandwidth, by performing at least one circular frequency shift operation on the digital composite signal.

15. The device of claim 14 wherein the circular shift unit is further adapted to:
- circularly shift the carrier-bands from the lowest to the highest frequency of the sampling bandwidth, in association with the reduction unit.

16. The device of claim 14 wherein the circular shift unit further comprises:
- a numerically controlled oscillator phase ramp that is used in the circular frequency shift operation.

17. A system comprising:
- a first processing unit comprising a first memory and a signal compression device that includes
  - a determining unit that receives a digital composite signal, and determines an outer gap for the digital composite signal, wherein the outer gap is located outside an instantaneous bandwidth and within a sampling bandwidth,
  - a reduction unit operatively coupled to the determining unit, wherein the reduction unit reduces a first inner gap in order to define a second inner gap between a plurality of carrier-bands, wherein a width of the second inner gap is related to a width of the outer gap, thereby creating a folded digital composite signal, and
  - a decimating unit operatively coupled to the reduction unit, wherein the decimating unit decimates the folded digital composite signal to a second sampling rate lower than the first sampling rate, thereby creating a decimated folded digital composite signal;
- a second processing unit operably coupled to the first processing unit, wherein the second processing unit comprises a second memory and a signal expansion device that includes
  - an interpolating unit that interpolates the decimated folded digital composite signal to the first sampling rate thereby creating an interpolated digital composite signal, and
  - an increasing unit that increases the second inner gap of the interpolated digital composite signal by an amount equal to the amount by which the first inner gap was reduced by the reducing unit;
- a communication interface configured to interface the transmitting device to the receiving device; and
- a transferring unit for transferring the folded digital composite signal or a processed version of the folded digital composite signal through the communication interface, from the first memory to the second memory.

18. The system of claim 17 wherein either or both the first processing unit and the second processing unit perform at least one signal processing operation on the decimated folded digital signal.

19. The system of claim 18 wherein the at least one signal processing operation is selected from a crest factor reduction operation and a noise cleaning operation.

20. A radio relay/repeater comprising:
- a signal compression device that includes
  - a determining unit that receives a digital composite signal,
  - wherein the digital composite signal was generated at a first sampling rate, the digital composite signal comprising a plurality of carrier-bands, including a first carrier-band and a second carrier-band, wherein the plurality of carrier-bands are arranged to define a first inner gap between the carrier-bands, the first inner gap comprising at least a first gap between a highest frequency of the first carrier-band and a lowest frequency of the second carrier-band, and the digital composite signal having a predetermined instantaneous bandwidth lower than a sampling bandwidth associated with the first sampling rate, and wherein the determining unit further determines an outer gap for the digital composite signal, wherein the outer gap is located outside the predetermined instantaneous bandwidth and within the sampling bandwidth,
- a reduction unit operatively coupled to the determining unit, wherein the reduction unit reduces the first inner gap in order to define a second inner gap between the plurality of carrier-bands, wherein a width of the second inner gap is related to a width of the outer gap, thereby creating a folded digital composite signal, and
- a decimating unit operatively coupled to the reduction unit, wherein the decimating unit decimates the folded digital composite signal to a second sampling rate lower than the first sampling rate, thereby creating a decimated folded digital composite signal; and a signal expansion device that includes
- an interpolating unit that processes the decimated folded digital composite signal by interpolating the decimated folded digital composite signal to the first sampling rate thereby creating an interpolated digital composite signal, and
- an increasing unit that increases the second inner gap of the interpolated digital composite signal by an amount equal to the amount by which the first inner gap was reduced by the reducing unit.

21. The device of claim 12 wherein the digital composite signal further comprises:
    a third carrier-band arranged such that the first inner gap further comprises a second gap between a highest frequency of the second carrier-band and a lowest frequency of the third carrier-band.

22. The device of claim 17 wherein the reduction unit further comprises:
    a circular shift unit that circularly shifts the carrier-bands in the frequency domain within the sampling bandwidth, by performing at least one circular frequency shift operation on the digital composite signal.

23. The device of claim 22 wherein the circular shift unit is further adapted to:
    circularly shift the carrier-bands from the lowest to the highest frequency of the sampling bandwidth, in association with the reduction unit.

24. The device of claim 22 wherein the circular shift unit further comprises:
    a numerically controlled oscillator phase ramp that is used in the circular frequency shift operation.

* * * * *